United States Patent
Tano et al.

(10) Patent No.: US 7,582,902 B2
(45) Date of Patent: Sep. 1, 2009

(54) RAW MATERIAL CARBON COMPOSITION FOR CARBON MATERIAL FOR ELECTRODE IN ELECTRIC DOUBLE LAYER CAPACITOR

(75) Inventors: Tamotsu Tano, Kuga-gun (JP); Shiro Nakamo, Kuga-gun (JP); Takashi Oyama, Kuga-gun (JP); Hideki Ono, Yokohama (JP); Keizou Ikai, Yokohama (JP); Kiwamu Takeshita, Tokyo (JP)

(73) Assignee: Nippon Oil Corporation, Tokyo (JP)

( * ) Notice: Subject to any disclaimer, the term of this patent is extended or adjusted under 35 U.S.C. 154(b) by 41 days.

(21) Appl. No.: 11/722,397

(22) PCT Filed: Dec. 21, 2005

(86) PCT No.: PCT/JP2005/023479

§ 371 (c)(1),
(2), (4) Date: Jun. 21, 2007

(87) PCT Pub. No.: WO2006/068173

PCT Pub. Date: Jun. 29, 2006

(65) Prior Publication Data

US 2008/0144255 A1    Jun. 19, 2008

(30) Foreign Application Priority Data

Dec. 22, 2004    (JP) .............................. 2004-371611

(51) Int. Cl.
*H01L 29/04*    (2006.01)
(52) U.S. Cl. .................... 257/71; 257/296; 257/301; 257/E27.092; 257/E27.093

(58) Field of Classification Search .................. 257/71, 257/296, 301, E27.092, E27.093
See application file for complete search history.

(56) References Cited

FOREIGN PATENT DOCUMENTS

| JP | 2001-52972 | 2/2001 |
|---|---|---|
| JP | 2002-25867 | 1/2002 |
| JP | 2002-93667 | 3/2002 |
| JP | 2003-51430 | 2/2003 |
| JP | 2004-182504 | 7/2004 |
| JP | 2004-247433 | 9/2004 |
| JP | 2005-142439 | 6/2005 |
| WO | WO96/30318 | 10/1996 |

*Primary Examiner*—Long Pham
(74) *Attorney, Agent, or Firm*—Knobbe Martens Olson & Bear LLP

(57) ABSTRACT

The present invention provides a raw material carbon composition that is converted to a carbon material for an electrode in an electric double layer capacitor that can develop a high level of electrostatic capacity with good reproducibility without producing any synthetic pitch. The raw material carbon composition is converted to a carbon material for an electrode in an electric double layer capacitor upon activation treatment and is characterized in that, when the raw material carbon composition is carbonized in an inert gas atmosphere at a temperature of 1000 to 1500° C., the true relative density (RD) and the total hydrogen content (TH %) in the carbonized material obtained after the burning satisfy the following formula (1):

$$RD = -0.75 TH\% + \text{intercept} \qquad (1)$$

wherein the intercept is 2.160 or greater.

22 Claims, 1 Drawing Sheet

RAW MATERIAL CARBON COMPOSITION FOR CARBON MATERIAL FOR ELECTRODE IN ELECTRIC DOUBLE LAYER CAPACITOR

TECHNICAL FIELD

The present invention relates to a raw material carbon composition for a carbon material for an electrode in an electric double layer capacitor (hereinafter referred to as an EDLC), a carbon material for an electrode obtained from the composition, and an electric double layer capacitor using the carbon material as the material for an electrode.

BACKGROUND ART

An example of a conventional method for manufacturing a carbon material for an EDLC electrode is a method in which raw material carbon (pitch) undergoes alkali activation directly or after carbonization (dry distillation).

A problem with the method in which raw material pitch is directly activated is that an EDLC to be provided has electrostatic capacity only on the order of 20 F/cc. On the other hand, it is known that the method in which raw material pitch is activated after dry distillation provides a high level of electrostatic capacity.

For example, Patent Document 1 (Japanese Patent Laid-Open No. 2002-25867) discloses (in the claim 8) a method for manufacturing non-porous carbon containing microcrystalline carbon similar to graphite and having a specific surface area of 270 m$^2$/g or smaller and an interlayer distance $d_{002}$ of 0.360 to 0.380 for the microcrystalline carbon. The method includes the steps of allowing readily-graphitizing carbon in which multilayer graphite microcrystals have been grown to undergo dry distillation at 700 to 850° C. so as to provide calcined carbon, thermally processing the resultant calcined carbon along with a caustic alkali at 800 to 900° C., and removing residual alkali. An EDLC using the carbon electrode obtained in this method has a high electrostatic capacity of 29 F/cc or greater. Specifically, the EDLC provided in this method uses a carbon material obtained by thermally processing (calcining) petroleum-based needle coke or infusibly-treated pitch as the raw material at 650 to 850° C. in a nitrogen stream for 2 to 4 hours followed by activation.

To manufacture activated carbon for an EDLC electrode by allowing mesophase pitch to undergo an infusibilizing treatment, carbonization and alkali activation, there has been proposed a method in which a massive mesophase pitch undergoes grinding, an infusibilizing treatment, carbonization and alkali activation (Patent Document 2 (Japanese Patent Laid-Open No. 2001-52972)). There have been also proposed a method including the steps of thermally processing (at 400 to 800° C.) raw material pitch having a softening point of 150 to 350° C., an H/C of 0.5 to 0.9, and an optical anisotropic content of 50% or greater, grinding the thermally-processed pitch into particles having an average diameter of 5 to 90 μm, and activating the resultant particles (at 400 to 900° C.) (Patent Document 3 (Japanese Patent Laid-Open No. 2002-93667)). These methods provide a carbon material for an electrode in an electric double layer capacitor having a high electrostatic capacity of 30 F/cc or greater. These methods, however, have a disadvantage that the high electrostatic capacity is not reproducibly obtained and hence cannot develop a high level of electrostatic capacity in a stable manner. To solve this problem, Patent Document 4 (Japanese Patent Laid-Open No. 2004-182504) proposes a method in which pitch having a crystallite thickness in the c-axis direction Lc(002) of 5.0 nm or greater, which is measured by X-ray diffraction, is carbonized and then activated. The raw material pitch having such characteristics is preferably synthetic pitch, which is obtained by polymerizing fused polycyclic hydrocarbon having at least one alkyl substituent group as the raw material at 100 to 400° C. under the presence of hydrogen fluoride and boron trifluoride. It has been also proposed that 5 mass. % of the above synthetic pitch or greater is added to inexpensive pitch having no alkyl substituent group, such as naphthalene pitch and anthracene pitch.

Patent Document 5 (Japanese Patent Laid-Open No. 2003-51430) discloses a method in which raw material carbon containing microcrystalline carbon having a layered crystal structure similar to graphite is heated to 600 to 900° C. and then activated. When the raw material carbon used in this method is a raw material carbon composition in which the interlayer distance $d_{002}$ determined by X-ray diffraction is 0.343 nm or smaller and the size $Lc_{002}$ of the crystallites of the microcrystalline carbon determined by X-ray diffraction is 3.0 nm, an EDLC having electrostatic capacity of 30 F/cc or greater is obtained.

Patent Document 1: Japanese Patent Laid-Open No. 2002-25867 (in the claim 8)

Patent Document 2: Japanese Patent Laid-Open No. 2001-52972

Patent Document 3: Japanese Patent Laid-Open No. 2002-93667

Patent Document 4: Japanese Patent Laid-Open No. 2004-182504

Patent Document 5: Japanese Patent Laid-Open No. 2003-51430

DISCLOSURE OF THE INVENTION

Problems to be Solved by the Invention

Although the conventional methods provide a high level of electrostatic capacity, inter-lot variation of raw material pitch disadvantageously prevents development of desired characteristics, particularly, a high level of electrostatic capacity with good reproducibility. According to Patent Document 4, although the reproducibility is ensured, the need to manufacture synthetic pitch is disadvantageous in terms of cost.

Furthermore, the definition of crystallites determined by X-ray diffraction does not necessarily shomasshe characteristics of the entire bulk of a raw material carbon composition. This will be understood from the description in "Handbook: carbon family" (editor: Michio Inagaki, Agne Shofu Publishing Inc.), "When selective orientation of crystallites is found (selective orientation is found in almost all carbon materials), X-ray diffraction may provide information on limited crystallites." Probably from this reason, petroleum coke and the like have not particularly been able to develop a high level of electrostatic capacity in a reproducible manner.

An object of the present invention is to provide a raw material carbon composition that is converted to a carbon material for an electrode in an electric double layer capacitor that can develop a high level of electrostatic capacity with good reproducibility without producing any synthetic pitch.

Means for Dissolving the Problem

The present inventors have conducted intensive studies to solve the above problems and found that selective use of a raw material carbon composition that exhibits a specific property in a carbonized region (1000 to 1500° C.) provides a carbon material for an EDLC electrode that can develop a high level of electrostatic capacity with good reproducibility.

That is, the present invention relates to a raw material carbon composition that is converted to a carbon material for an electrode in an electric double layer capacitor upon activation treatment characterized in that, when the raw material carbon composition is carbonized in an inert gas atmosphere at a temperature of 1000 to 1500° C., the true relative density (RD) and the total hydrogen content (TH %) in the carbonized material obtained after the burning satisfy the following formula (1):

$$RD = -0.75 TH\% + \text{intercept} \quad (1)$$

wherein the intercept is 2.160 or greater.

The present invention also relates to a method for manufacturing a raw material carbon composition that is converted to a carbon material for an electrode in an electric double layer capacitor, characterized in that the method comprises steps of:

blending multiple kinds of starting raw material oils after adjusting the combination and/or the blending ratio thereof and coking the blended oils to provide a raw material carbon composition that satisfies formula (1) according to claim 1 wherein the intercept is 2.160 or greater.

EFFECTS OF THE INVENTION

According to the present invention, the crystallizability based on RD/TH is a meaning that the entire bulk of the raw material carbon composition is measured, and appropriate adjustment of the crystallizability can provide a carbon material for an EDLC electrode that develops a high level of electrostatic capacity with good reproducibility without producing any synthetic pitch in a stable manner, allowing an EDLC having a high electrostatic capacity of 30 F/cc or greater to be provided.

BEST MODE FOR CARRYING OUT THE INVENTION

Figure 1:
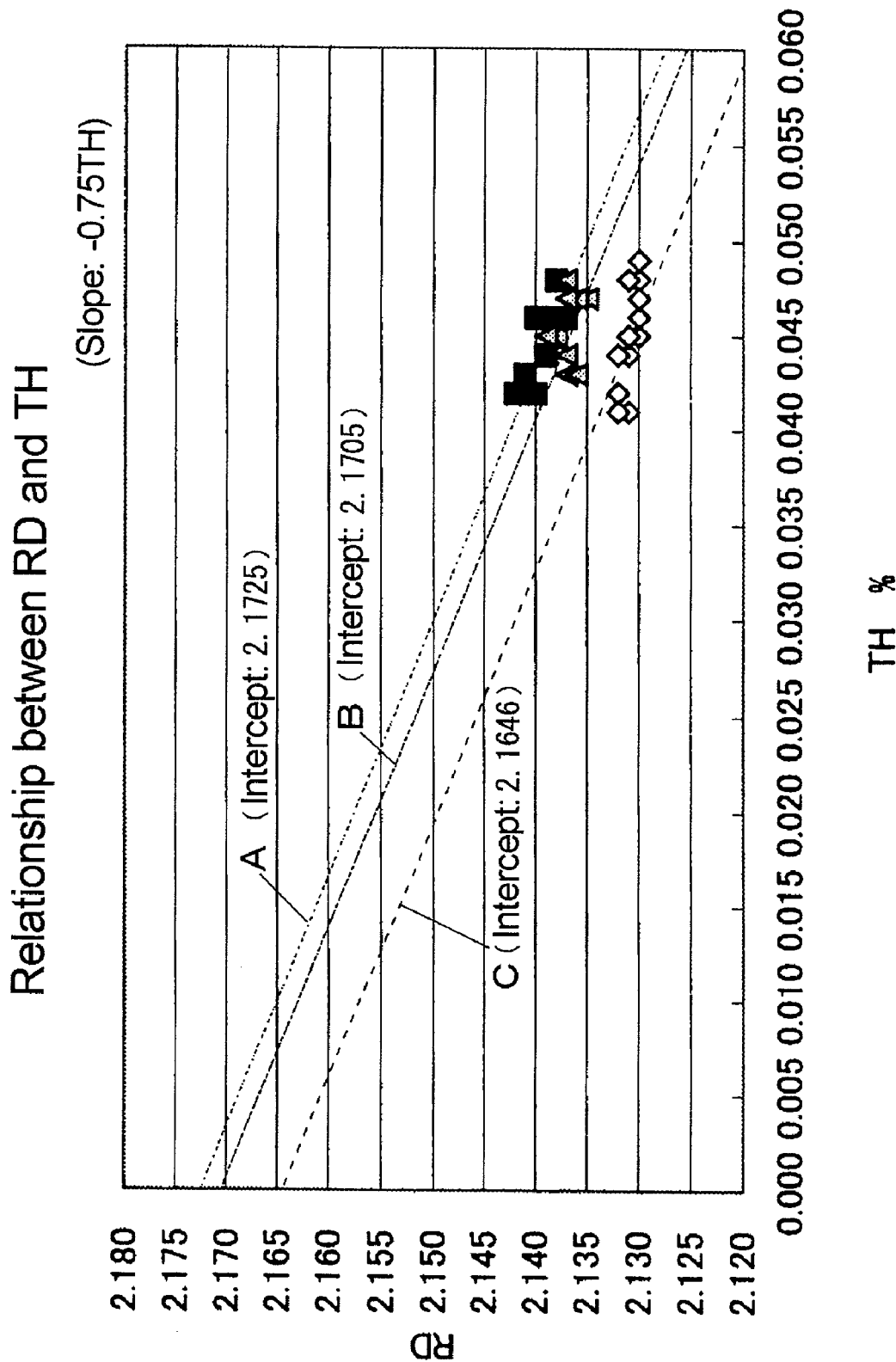
FIG. 1 is a graph showing the relationship between RD and TH.

Although the crystallizability of raw material carbon has conventionally been evaluated by measuring the interlayer distance or the size of crystallites directly in X-ray diffraction, the present inventors have found correlation between the true relative density (RD) and the total hydrogen content (TH) of burned coke in association with the crystallizability of the burned coke.

It has been found that the relationship between the values of RD and TH (mass. %) of burned coke greatly differs depending on the kinds of starting raw material oil (a vacuum residue (VR), CLO and the like) and the blending ratio thereof, and that adjustment of these parameters can control the crystallizability of the entire bulk.

Furthermore, according to the investigation conducted by the present inventors, it is considered that the influence of the crystallizability similarly affect in raw coke before burning and intermediate processes.

The present inventors have investigated the relationship between RD and TH of burned coke from such a viewpoint and found that an unburned carbon material, which is used as an EDLC electrode material, can be made to a carbon material having excellent characteristics by evaluating the crystallizability as burned coke.

FIG. 1 shows graphs illustrating the relationship between RD and TH when three kinds of raw material carbon compositions (A, B and C) are burned at 1000 to 1500° C. in an inert gas atmosphere. As shown in FIG. 1, the results for all the kinds fit on respective straight lines, each having a slope of −0.75. RD and TH have been investigated for other raw material carbon compositions using similar approaches, and it has been verified that all results fit on straight lines having slopes of about −0.75.

When the intercept at which TH % is 0 has been obtained and it is 2.160 or greater, it has been verified that electrostatic capacity higher than conventionally achievable is obtained. In particular, when a raw material carbon composition having the intercept of 2.170 or greater is used, an excellent EDLC having an electrostatic capacity of 30 F/cc or greater is obtained. More preferably, the intercept is 2.173 or greater.

A raw material carbon composition having such a large intercept can be prepared, for example, by coking heavy hydrocarbon, which contains a minimum amount of impurities such as sulfur and metals and has an appropriate aromaticity, in an appropriate condition.

Examples of the "heavy hydrocarbon which has an appropriate aromaticity" include bottom oil in a fluid catalytic cracker for petroleum heavy oil, a vacuum residue (VR) in a vacuum distillation apparatus, and tar of aromatic compounds.

In the present invention, by appropriately selecting kinds of starting crude oils and the blending ratio thereof, a raw material carbon composition having a large intercept in formula (1) is obtained. For example, bottom oil in a fluid catalytic cracker for petroleum heavy oil is mixed with a vacuum residue in a vacuum distillation apparatus to obtain a heavy oil mixture containing a relatively small amount of sulfur and asphaltene. The heavy oil mixture is coked at a temperature of about 400 to 600° C. for several hours in an autoclave under pressure (1 MPa, for example), and then a raw material carbon composition defined in the present invention is obtained.

Such heavy hydrocarbon has a readily graphitizing property, so that in the coking process, condensed polycyclic aromatic rings produced in the thermal decomposition reaction is stacked to form raw material carbon containing microcrystalline carbon similar to graphite. Thus, raw material carbon obtained from such heavy hydrocarbon also has a high readily-graphitizing property as described above. In the present invention, in particular, a raw material carbon composition preferably contains such microcrystalline carbon similar to graphite.

The inert gas, which is an atmospheric gas used in carbonization at 1000 to 1500° C., is not limited to a specific one, but an inert gas typically used in this field, such as nitrogen and argon, is used. To minimize the amount of oxygen, the atmospheric gas is desirably replaced with an inert gas after temporarily reducing the pressure.

RD and TH are measured in the following method, but not limited thereto. Other known methods may be used as long as equivalent evaluation is possible.

<<Total Hydrogen Content (TH)>>

In the measurement of TH, the carbonized specimen is completely combusted at 750° C. in an oxygen stream and the amount of water produced from the combusted gas is determined by coulometric titration (Karl Fischer method). In the Karl Fischer method based on coulometric titration, an electrolyte mainly containing iodide ions, sulfur dioxide, base (RN) and alcohol is poured in a titration cell and then the specimen is put in the titration cell. The moisture in the specimen then reacts according to formula (2).

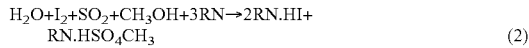

$$H_2O+I_2+SO_2+CH_3OH+3RN \rightarrow 2RN.HI+ RN.HSO_4CH_3 \qquad (2)$$

Iodine necessary for this reaction is obtained by allowing the iodide ions to react in an electrochemical manner (two-electron reaction) (the following formula (3)).

$$2I^- - 2e \rightarrow I_2 \qquad (3)$$

Since 1 mol of water reacts with 1 mol of iodine, the amount of electricity necessary to titrate 1 mg of water is determined by Faraday's law as follows:

$$(2\times 96478)/(18.0153\times 10^3)=10.71 \text{ coulomb}$$

where the constant 96478 is Faraday's constant and 18.0153 is the molecular weight of water.

By measuring the amount of electricity required to produce iodine, the amount of water is determined.

Then, the resultant amount of water is converted into the amount of hydrogen, which is divided by the mass of the specimen used in the measurement so as to calculate the total hydrogen content (TH (mass. %)).

<<True Relative Density (RD)>>

RD is measured according to JIS K2151.

<Activation Treatment>

A carbon material for an EDLC electrode is obtained by activating a raw material carbon composition having the above characteristics. Known conventional methods can be applied to the activation treatment, and examples of which include chemical activation reactions and gas activation reactions. The chemical activation reaction is more preferable, and an activation reaction using an alkali metal compound is particularly preferable. According to such an activation treatment using an alkali metal compound, the alkali metal intrudes between graphite crystal layers and then starts the activation reaction, so that the specific surface area of the resultant carbon material is improved.

Various carbonates and hydroxides can be used as the alkali metal compound, and specifically, examples of the carbonates and hydroxides include sodium carbonate, potassium carbonate, potassium hydroxide, sodium hydroxide, lithium hydroxide, rubidium hydroxide and cesium hydroxide. Among them, an alkali metal hydroxide, such as potassium hydroxide and sodium hydroxide, is preferable, and potassium hydroxide is particularly preferable. In addition, two or more kinds of these alkali metal compounds (potassium hydroxide and sodium hydroxide, for example) may be used at the same time.

The activation is typically performed by mixing an activation agent, such as an alkali metal compound, with a raw material carbon composition and heating the mixture. The mixing ratio of the raw material carbon composition to the activation agent, such as an alkali metal hydroxide, is not limited to a specific value, but the mass ratio between the two (raw material carbon composition:activation agent) is preferably in the range from 1:0.5 to 1:10, more preferably 1:1 to 1:5. In general, if the amount of the activation agent, such as an alkali metal compound, is too small, the activation reaction will not sufficiently proceed, so that necessary surface area may not be obtained. On the other hand, although a greater amount of the activation agent increases the specific surface area, not only will the activation cost increase but also the activation yield will decrease. In this case, the volume density of the resultant carbon material also tends to decrease, so that electrostatic capacity per unit volume decreases.

The heating temperature in the activation treatment is not limited to a specific one. However, the lower limit of the heating temperature is typically 500° C., preferably 600° C., and the upper limit thereof is typically 1000° C., preferably 900° C., particularly preferably 800° C.

The raw material carbon composition according to the present invention is thus activated and then typically undergoes alkali washing, acid washing, rinsing, drying and grinding processes into a carbon material for an EDLC electrode. When an alkali metal compound is used as the activation agent, the amount of the alkali metal left in the carbon material is not limited to a specific value as long as it is lower than the level at which the residual alkali metal adversely affects the resultant EDLC (preferably 1000 ppm or lower). For example, it is typically desirable that the washing is performed in such a way that pH of the washing wastewater is on the order of 7 to 8 and the amount of the alkali metal is minimized. The grinding process is performed in a known method to desirably provide fine particles typically having an average diameter on the order of 0.5 to 50 μm, preferably 1 to 20 μm.

The EDLC according to the present invention will now be described.

The EDLC according to the present invention is characterized in that it comprises electrodes containing a carbon material for an electrode prepared as described above.

The electrode is made of, for example, a carbon material for an electrode and a binder, more preferably a conductive agent added thereto. The electrode may also be integrated with a current collector.

The binder used herein can be a known binder. Examples of the binder include polyolefins such as polyethylene and polypropylene; fluoropolymers such as polytetrafluoroethylene, polyvinylidene fluoride, crosslinked fluoroolefin/vinylether copolymer; cellulose such as carboxymethylcellulose; vinyl-based polymers such as polyvinyl pyrrolidone and polyvinyl alcohol; and polyacrylic acid. The content of the binder in the electrode is not limited to a specific value, but it is selected as appropriate to be typically within a range from about 0.1 to 30 mass. % with respect to the total amount of the carbon material for an electrode and the binder.

Examples of the conductive agent include powder of carbon black, powdery graphite, titanium oxide, ruthenium oxide and the like. The blending amount of the conductive agent in the electrode, which is selected as appropriate according to the purpose of blending, is selected as appropriate to be typically within a range from about 1 to 50 mass. %, preferably about 2 to 30 mass. % with respect to the total amount of the carbon material for an electrode, the binder and the conductive agent.

As a method for mixing the carbon material for an electrode, the binder and the conductive agent, known methods are applied as appropriate. For example, examples of the method to be employed include a method in which a solvent having a property of dissolving the binder is added to the above components and the resultant slurry mixture is uniformly coated on the current collector, and a method in which the above components without any solvent is kneaded and then formed under pressure at normal or elevated temperature.

As the current collector, known materials and shapes can be used. Examples of the material of the current collector include metals such as aluminum, titanium, tantalum and nickel, and alloys such as stainless steel.

A unit cell of the EDLC according to the present invention is typically formed by using a pair of the above electrodes as positive and negative electrodes, disposing the electrodes in such a way that they face each other with a separator (such as polypropylene-fiber non-woven fabric, glass-fiber non-woven fabric and synthetic cellulose) interposed therebetween, and submerging them in an electrolyte.

As the electrolyte, known water-based electrolyte and organic electrolyte can be used, and organic electrolyte is more preferably used. As the organic electrolyte, those used as a solvent of an electrolyte in electrochemistry can be used. Examples of the electrolyte include propylene carbonate, ethylene carbonate, butylene carbonate, γ-butyrolactone, sulfolane, sulfolane derivatives, 3-methylsulfolane, 1,2-dimethoxyethane, acetonitrile, glutaronitrile, valeronitrile, dimethylformamide, dimethyl sulfoxide, tetrahydrofuran, dimethoxyethane, methyl formate, dimethyl carbonate, diethyl carbonate and ethyl methyl carbonate. These electrolytes may be mixed for use.

A supporting electrolyte in the organic electrolyte is not limited to a specific one, and various supporting electrolytes, such as salts, acids and alkalis typically used in the fields of electrochemistry and batteries, can be used. Examples of the supporting electrolyte include inorganic ion salts such as alkali metal salts and alkaline-earth metal salts, quaternary ammonium salts, cyclic quaternary ammonium salts and quaternary phosphonium salts. Preferred examples of the supporting electrolyte include $(C_2H_5)_4NBF_4$, $(C_2H_5)_3(CH_3)NBF_4$, $(C_2H_5)_4PBF_4$ and $(C_2H_5)_3(CH_3)PBF_4$. The concentration of the salt in the electrolyte is selected as appropriate to be typically within the range from about 0.1 to 5 mol/liter, preferably about 0.5 to 3 mol/liter.

Although a more specific configuration of the EDLC is not limited to a particular one, examples thereof include a coin type in which a pair of thin sheet-like or disc-like (positive and negative) electrodes, each having a thickness of 10 to 500 μm, with a separator interposed therebetween are housed in a metallic container, a coiled type in which a pair of electrodes are coiled with a separator interposed therebetween, and a stacked type in which a large number of electrode groups are stacked with a separator interposed therebetween.

EXAMPLES

Although the present invention will be described below with reference to examples, the present invention is not limited to only these examples.

The total hydrogen content (TH) and the true relative density (RD) of a specimen were measured in the following methods:

Total hydrogen content: The specimen ground into particles, each having a size of 74 μm or smaller (at least 200 mesh), was completely combusted in an oxygen stream in a movable furnace at 750° C. The combusted gas was allowed to pass a stationary furnace filled with copper-copper oxide-copper-desulfurizing agent-copper at 750° C. After desulfurization and denitrification, coulometric titration (Karl Fischer method) using a coulometric titration apparatus was used to determine the amount of generated water so as to calculate the total hydrogen content.

True relative density: A water displacement method using a pycnometer was used to measure the true relative density. Specifically, the specimen was ground into particles, each having a size of 74 μm or smaller (at least 200 mesh). Nine to eleven grams of the ground specimen was collected in the pycnometer, submerged in distilled water, boiled and degassed. Then, the true volume of the specimen was determined. The weight of the collected specimen was divided by the true volume to calculate the true relative density. The following formula was used for the calculation:

$$RD = \frac{m1 - m2}{(m1 - m3 + m4 - m2) \div 0.99567} \quad \text{[Formula 1]}$$

In the above formula, m1 is the mass (g) when the specimen is placed in the pycnometer; m2 is the mass (g) of the pycnometer; m3 is the mass (g) when the distilled water (at 30° C.) is filled in the pycnometer with the specimen placed therein; m4 is the mass when the empty pycnometer is filled with the distilled water (at 30° C.). The constant 0.99567 is the density of water ($g/cm^3$) at 30° C.

The specific surface area of the resultant carbon material was measured using the BET method.

Example 1

(i) Preparation of Raw Material Carbon Composition

Bottom oil in a fluid catalytic cracker for petroleum heavy oil was mixed with a vacuum residue in a vacuum distillation apparatus to provide a heavy oil mixture containing 0.17 mass. % of sulfur and 0.9 mass. % of asphaltene. The heavy oil mixture was coked in an autoclave under a pressure of 1 MPa at 550° C. for 2 hours to provide a raw material composition.

The resultant raw material carbon composition was burned at 1000 to 1500° C. in an inert gas atmosphere and the total hydrogen content and the true relative density were determined. Table 1 shows the results.

(ii) Manufacture of Carbon Material

The raw material carbon composition (100 mass parts) was mixed with potassium hydroxide (200 mass parts). The mixture underwent an activation reaction at 750° C. for 1 hour in a nitrogen gas atmosphere. After the reaction, the resultant product repeatedly underwent rinsing and acid washing (using HCl) to remove metal potassium left in the carbon material. The resultant product was then dried to provide a carbon material for an EDLC electrode.

(iii) Fabrication of Electrode

The carbon material (80 mass parts) ground into particles having an average diameter of 40 μm was mixed with carbon black (10 mass parts) and polytetrafluoroethylene powder (10 mass parts). The mixture was kneaded into paste in a mortar. Then, the resultant paste was rolled with a 180 kPa-class roller press into an electrode sheet having a thickness of 200 μm.

(iv) Assembly of Cell

The electrode sheet was punched into two discs having a diameter of 16 mm. The discs were subjected to a vacuum dry at 120° C. under a pressure of 13.3 Pa (0.1 Torr) for 2 hours, and then underwent vacuum impregnation of an organic electrolyte (propylene carbonate solution of triethylmethylammonium tetrafluoroborate, concentration: 1 mol/liter) in a glove box in a nitrogen atmosphere with a dew point of −85° C. A glass-fiber separator (Advantec Toyo Kaisha, Ltd., model: GA-200, thickness: 200 μm) was interposed between the two electrodes, one used as a positive electrode and the other used as a negative electrode, and an aluminum-foil current collector was attached to each end of the electrodes.

The assembled structure was then incorporated into a two-electrode cell (Hohsen Corporation). An electric double layer capacitor (coin-type cell) was thus fabricated.

(v) Measurement of Electrostatic Capacity

The above coin-type cell was subjected to constant-current charge with a current of 10 mA per farad to achieve a voltage of 2.7 V. After the charge was completed, the cell was held at 2.7 V for 12 hours, and then underwent a 10-mA constant current discharge process. The amount of energy during the discharge was used to calculate electrostatic capacity according to the following formula:

Total discharged energy W[W·s]={electrostatic capacity C[F]×(discharge initiation voltage V[V])$^2$}/2

Example 2

The activation, the fabrication of the electrode, and the assembly of the cell were conducted in the same way as Example 1 to determine electrostatic capacity except that the raw material carbon composition was prepared according to the following procedure.

Bottom oil in a fluid catalytic cracker for petroleum heavy oil was mixed with a vacuum residue in a vacuum distillation apparatus to provide a heavy oil mixture containing 0.26 mass. % of sulfur and 1.5 mass. % of asphaltene. The heavy oil mixture was coked in an autoclave under a pressure of 1 MPa at 550° C. for 2 hours to provide the raw material composition.

The resultant raw material carbon composition was burned at 1000 to 1500° C. in an inert gas atmosphere and the total hydrogen content and the true relative density were determined. Table 1 shows the results.

Comparative Example 1

The activation, the fabrication of the electrode, and the assembly of the cell were conducted in the same way as Example 1 to determine electrostatic capacity except that the raw material carbon composition was prepared according to the following procedure.

Bottom oil in a fluid catalytic cracker for petroleum heavy oil was mixed with a vacuum residue in a vacuum distillation apparatus to provide a heavy oil mixture containing 0.19 mass. % of sulfur and 9.0 mass. % of asphaltene. The heavy oil mixture was coked in an autoclave under a pressure of 1 MPa at 550° C. for 2 hours to provide the raw material composition.

The resultant raw material carbon composition was burned at 1000 to 1500° C. in an inert gas atmosphere and the total hydrogen content and the true relative density were determined. Table 1 shows the results.

Comparative Example 2

The activation, the fabrication of the electrode, and the assembly of the cell were conducted in the same way as Example 1 to determine electrostatic capacity except that the raw material carbon composition was prepared according to the following procedure.

Bottom oil (15 vol. %) in a fluid catalytic cracker for petroleum heavy oil was blended with a vacuum residue (85 vol. %) in a vacuum distillation apparatus (0.18 mass. % of sulfur and 8.5 mass. % of asphaltene). The heavy oil mixture was coked in an autoclave under a pressure of 1 MPa at 550° C. for 2 hours to provide the raw material composition. The resultant raw material carbon composition was burned at 1000 to 1500° C. in an inert gas atmosphere and the total hydrogen content and the true relative density were determined. Table 1 shows the results.

TABLE 1

| | RD g/cm$^3$ | TH mass. % | RD-TH % intercept | Specific surface area m$^2$/g | Electrostatic capacity F/cc |
|---|---|---|---|---|---|
| Ex. 1 | 2.131 | 0.059 | 2.175 | 1900 | 33 |
| Ex. 2 | 2.139 | 0.043 | 2.171 | 1600 | 31 |
| Com. Ex. 1 | 2.135 | 0.028 | 2.156 | 1850 | 21 |
| Com. Ex. 2 | 2.139 | 0.026 | 2.159 | 1900 | 24 |

Table 1 apparently shows that there is substantially proportional relationship between the intercept and the electrostatic capacity. In particular, when the intercept is 1.170 or greater, it is indicated that a electrostatic capacity of 30 F/cc or more is obtained.

The invention claimed is:

1. A raw material carbon composition that is converted to a carbon material for an electrode in an electric double layer capacitor upon activation treatment, the raw material carbon composition characterized in that, when the raw material carbon composition is carbonized in an inert gas atmosphere at a temperature of 1000 to 1500° C, the true relative density (RD) and the total hydrogen content (TH%) in the carbonized material obtained after the burning satisfy the following formula (1):

$$RD = -0.75\, TH\% + \text{intercept} \qquad (1)$$

wherein the intercept is 2.160 or greater.

2. The raw material carbon composition that is converted to a carbon material for an electrode in an electric double layer capacitor according to claim 1, characterized in that the raw material carbon composition has microcrystalline carbon similar to graphite.

3. A method for manufacturing a raw material carbon composition according to claim 1, comprising:
   blending multiple kinds of starting raw material oils after adjusting the combination and/or the blending ratio thereof, and
   coking the blended oils to.

4. A carbon material for an electrode in an electric double layer capacitor obtained by activating the raw material carbon composition according to claim 1.

5. The carbon material for an electrode in an electric double layer capacitor according to claim 4, characterized in that the activation treatment uses an alkali metal compound.

6. The carbon material for an electrode in an electric double layer capacitor according to claim 4, characterized in that the activation treatment is performed at a temperature ranging from 500 to 1000° C.

7. An electric double layer capacitor characterized in that the electric double layer capacitor comprises an electrode containing the carbon material for an electrode according to claim 4.

8. A carbon material for an electrode in an electric double layer capacitor obtained by activating the raw material carbon composition according to claim 2.

9. The carbon material for an electrode in an electric double layer capacitor according to claim 8, characterized in that the activation treatment uses an alkali metal compound.

10. The carbon material for an electrode in an electric double layer capacitor according to claim 5, characterized in that the activation treatment is performed at a temperature ranging from 500 to 1000° C.

11. The carbon material for an electrode in an electric double layer capacitor according to claim 8, characterized in that the activation treatment is performed at a temperature ranging from 500 to 1000° C.

12. The carbon material for an electrode in an electric double layer capacitor according to claim 9, characterized in that the activation treatment is performed at a temperature ranging from 500 to 1000° C.

13. An electric double layer capacitor characterized in that the electric double layer capacitor comprises an electrode containing the carbon material for an electrode according to claim 5.

14. An electric double layer capacitor characterized in that the electric double layer capacitor comprises an electrode containing the carbon material for an electrode according to claim 6.

15. An electric double layer capacitor characterized in that the electric double layer capacitor comprises an electrode containing the carbon material for an electrode according to claim 8.

16. An electric double layer capacitor characterized in that the electric double layer capacitor comprises an electrode containing the carbon material for an electrode according to claim 9.

17. An electric double layer capacitor characterized in that the electric double layer capacitor comprises an electrode containing the carbon material for an electrode according to claim 10.

18. An electric double layer capacitor characterized in that the electric double layer capacitor comprises an electrode containing the carbon material for an electrode according to claim 11.

19. An electric double layer capacitor characterized in that the electric double layer capacitor comprises an electrode containing the carbon material for an electrode according to claim 12.

20. A raw material carbon composition convertible to a carbon material for an electrode, which has an intercept value of 2.160 or greater as measured when true relative density (RiD) and total hydrogen content (TH %) of a carbonized material of the raw material carbon composition are plotted using the following formula (1):

$$RD = -0.75\, TH\% + \text{intercept} \tag{1}$$

said carbonized material being obtained by carbonizing the raw material carbon composition in an inert gas atmosphere at a temperature of 1000 to 1500° C.

21. The raw material carbon composition according to claim 20, wherein the raw material carbon composition contains microcrystalline carbon similar to graphite.

22. The raw material carbon composition according to claim 20, which is a heavy oil mixture comprising bottom oil in a fluid catalytic cracker for petroleum heavy oil mixed with a vacuum residue in a vacuum distillation apparatus.

* * * * *

UNITED STATES PATENT AND TRADEMARK OFFICE
CERTIFICATE OF CORRECTION

PATENT NO. : 7,582,902 B2  Page 1 of 1
APPLICATION NO. : 11/722397
DATED : September 1, 2009
INVENTOR(S) : Tamotsu Tano et al.

It is certified that error appears in the above-identified patent and that said Letters Patent is hereby corrected as shown below:

Column 10, lines 1-5, Delete "The resultant raw material carbon composition was burned at 1000 to 1500.degree. C. in an inert gas atmosphere and the total hydrogen content and the true relative density were determined. Table 1 shows the results" and insert the same on Column 10, line 2 as a new paragraph.

Column 10, line 20, Change "1.170" to --2.170--.

Column 10, line 29, In Claim 1, change "1500°C," to --1500°C.,--.

Column 10, line 46, In Claim 3, change "oils to." to --oils.--.

Column 12, line 16, In Claim 20, change "(RiD)" to --(RD)--.

Signed and Sealed this

Fourth Day of May, 2010

David J. Kappos
*Director of the United States Patent and Trademark Office*